INVENTOR.
BIRGER ARTHUR EMIL QVARNSTRÖM
BY Hane and Nydick
ATTORNEYS 3,351,829
STABILIZING DEVICE FOR A
CONTROL SYSTEM
Birger Arthur Emil Qvarnström, Gothenburg, Sweden, assignor to Aktiebolaget Bofors, Bofors, Sweden, a corporation of Sweden
Filed Jan. 30, 1964, Ser. No. 341,344
3 Claims. (Cl. 318—18)

ABSTRACT OF THE DISCLOSURE

There is disclosed a servo control system wherein a control signal directs the movement of a gun. The control signal is compared against a feedback signal to generate an error signal which is used to move, via electro-mechanical means, the gun. A sensor associated with the gun is fed to one input of a switching means while the error signal is fed, via analog means having the same transmission properties as the means which move the gun, to another input of the switching means. The switching means transmits only one of the signals received at its inputs as the feedback signal. The selection is done on the basis of frequency.

Figure 1:
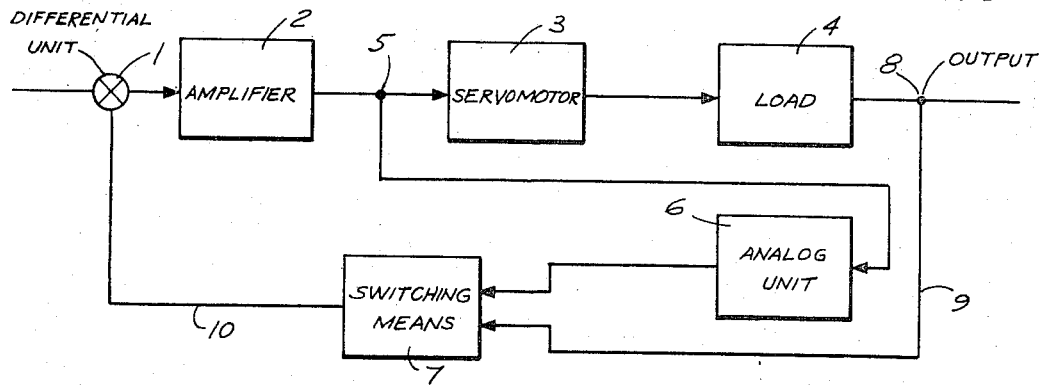

The present invention relates to control systems as used, for instance, in connection with the training of guns, and more particularly to control systems including stabilizing means.

In control systems of the general kind above referred to accurate and rapid follow and adjustment action are usually required.

It is known to provide a high error-signal amplification for such purpose. However, the use of high amplification entails the risk of rendering the system unstable. This tendency of instability has been counteracted by using in the control system components only which have inherently favorable performance characteristics in respect to instability. It is also known to utilize derivative filter networks to eliminate the tendency of instability in the event of a high error-signal amplification.

While the aforementioned anti-instability components are satisfactory under many conditions, they are unsatisfactory when the purpose of the control system, such as the training of guns, makes it necessary or desirable to introduce into the error-signal channel of the system one or several components such as high gain amplification, which have basically a simple unequivocal performance characteristic favorable for the stability of the system, but within a limited though definite frequency range develop dynamic characteristics which have an adverse effect upon the stability of the system. Such adverse characteristics may be due to mechanical resonance, friction, play, etc.

If, in a system including such components, a high gain amplification is used, it has been found that derivative filter networks and other known anti-instability means are not sufficient to obtain satisfactory stability.

Accordingly, it is an object of the invention to provide a novel and improved control system including in its error-signal channel one or several components causing instability within a definite limited frequency range which system permits the use of a high gain amplification for the purpose of high speed and accuracy, yet is adequately stabilized.

A further object of the invention is to provide a novel and improved control system of the general kind above referred to which includes circuit means automatically nullifying the effect upon the stability of the system by the aforesaid components when the latter are operating within the critical frequency range in which they may have such effect.

Basically the concept of the invention resides in including in the control system analog means which have the same transmission properties as the components causing the instability within said limited frequency range, but are free throughout the entire frequency range of characteristics causing instability, and automatic preferably electronic switching means rendering the analog means inoperative for transmission when and while said component or components operate outside said limited frequency range, but rendering the analog means operative and the components inoperative for transmission when and while the components operate within said frequency range.

Other and further objects, features and advantages of the invention will be pointed out hereinafter and set forth in the appended claims forming part of the application.

In the accompanying drawing, several preferred embodiments of the invention are shown by way of illustration and not by way of limitation.

Figure 2:
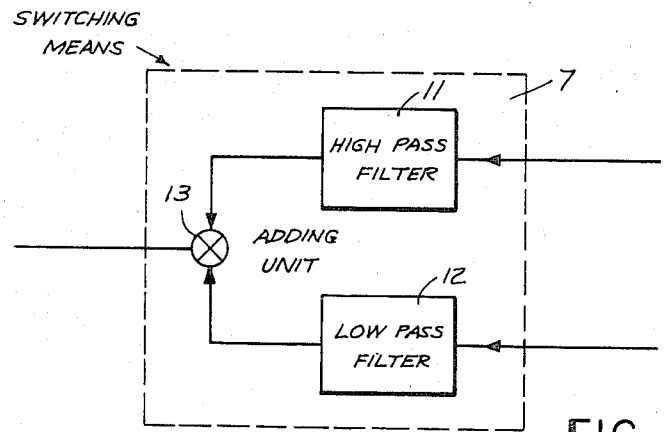
Figure 3:
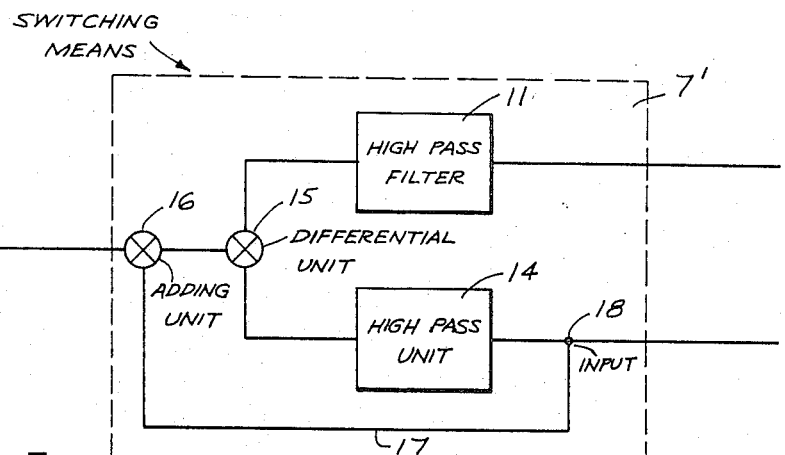
Figure 4:
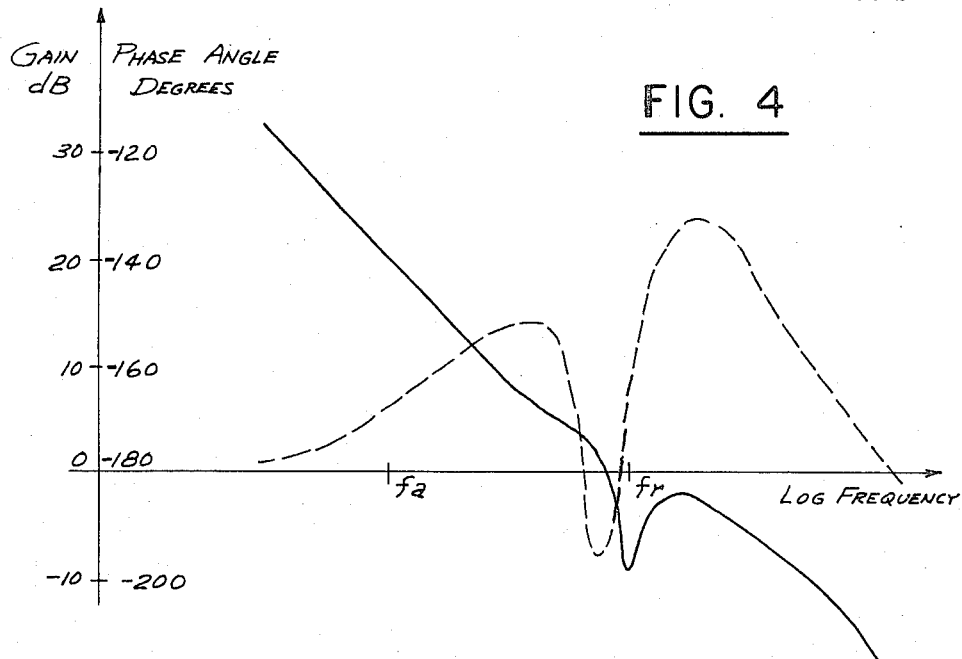
Figure 5:
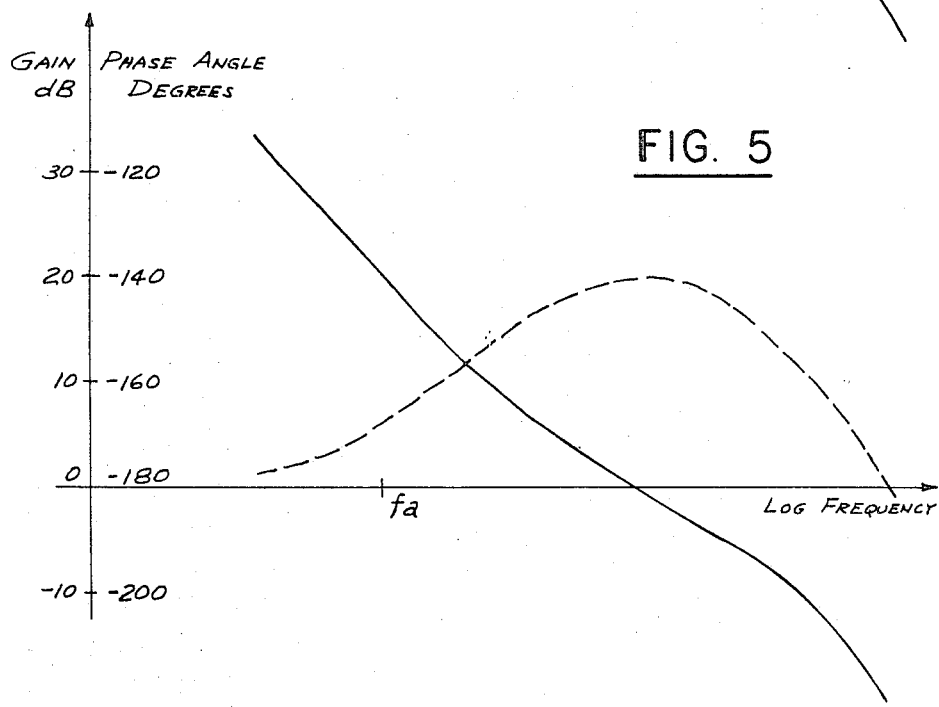
Figure 6:
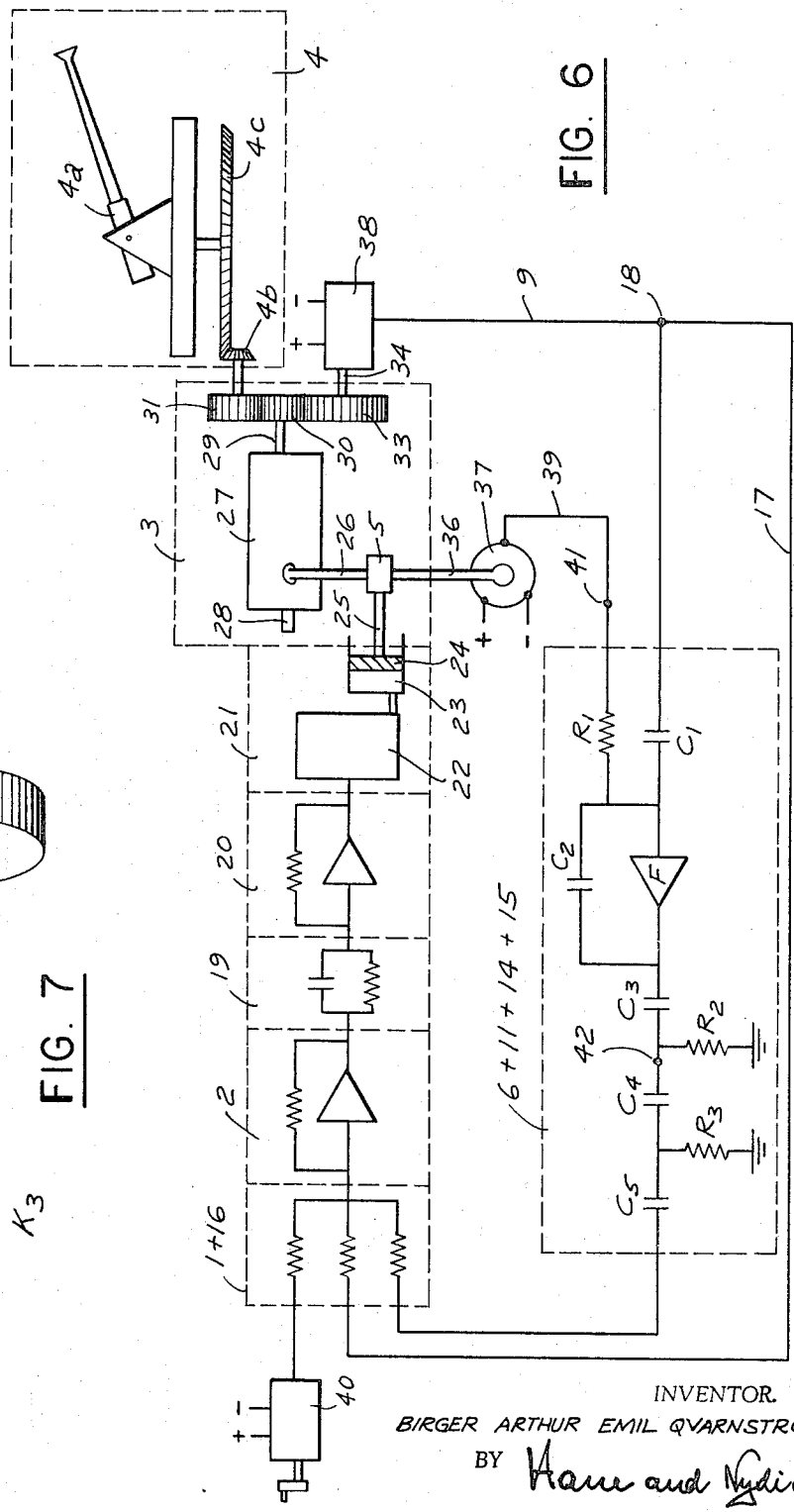
Figure 7:
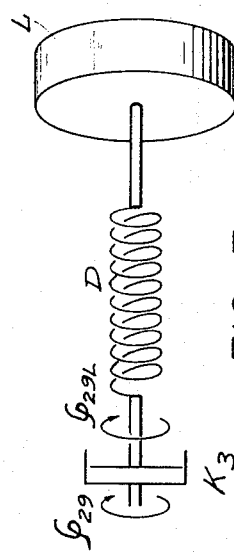

In the drawing:

FIG. 1 is a block diagram of a control system including stabilizing means according to the invention, FIG. 2 is a block diagram of the switching means used in the system of FIG. 1, FIG. 3 is a block diagram of a modification of the switching means used in the system of FIG. 1, FIGS. 4 and 5 are Bode diagrams showing the function of the control system of FIG. 1, FIG. 6 is a circuit diagram showing in greater detail a control of the kind diagrammatically shown in FIG. 1, and FIG. 7 illustrates in diagrammatic form the function of some of the components used in the system of FIG. 6.

Turning now to the figures in detail, the system shown in block diagrams of FIGS. 1 and 2 comprises a differential unit 1 connected to an amplifier 2 which, in turn, is connected to a servo system 3, connected to a load 4. The input side 5 of the servo system is connected to an analog unit 6, the output of which is connected to an input of a switching means 7.

The aforelisted circuit components should be visualized as being of conventional design. An analog unit in the form of an integrating unit, for instance an electrical integrating network, has been found to be suitable.

The output side 8 of the control system is connected through a conductor 9 to a second input of the switching means 7, and the output of the switching means is connected through a conductor 10 to differential unit 1.

The switching means 7 and conductors 9 and 10 constitute a conventional resetting or feedback device for the servo system.

Components 3 and 4 should be visualized as having performance characteristics such that they may develop a mechanical resonance within a predetermined frequency range. As explained before, such resonance may cause instability in the control system. The analog unit 6 has the same transmission characteristics as components 3 and 4, but does not develop resonance phenomena throughout the entire frequency range and hence will not cause instability in the control system at any operational frequency. As is evident, the number of components, such as components 3 and 4, is not fixed but a larger or smaller number than two may be provided.

The switching means 7 shown in FIG. 2 comprises a high-pass filter 11, a low-pass filter 12 and an adding unit 13, connected to the outputs of the filters and to differential unit 1. The high-pass filter 11 will pass signals within the frequency range in which the resonance phenomena may exist. This frequency range may be defined as $$f_a-\infty$$

where $f_a$ is the lower limit frequency for the frequency range in which the resonance phenomena exist or may exist.

The low-pass filter 12 passes signals below the frequency range where the resonance phenomena exists, or may exist, and this frequency range may be defined as $$0-f_a$$

As it is well known, a low-pass filter can transmit low frequency signals and suppress high frequency signals simultaneously, thus there will always be a feedback via conductor 9, low-pass filter block 12, adding unit 13 and conductor 10.

In order to prevent an adverse effect of the filters themselves upon the stability of the control system, the signal transmission characteristics of the filters should approximately satisfy the equation:

$$A_H(f)=A_L(f)$$

where $A_H(f)$ is the transmission characteristic of the high-pass filter and $A_L(f)$ is the transmission characteristic of the low-pass filter.

The aforesaid conditions can also be expressed by stating that the filter network of the switching means has a characteristic such that it does not vary the amplitude and the phase angle of transmitted signals at differential frequencies when the filters are connected in parallel. In other words, the two filters of the switching means are correlated in a manner such that they constitute a filter or bypass network.

The parallel connection of the filters should be such that the same input signal is applied to each filter and the output signals are added without the filters applying a load, one to the other.

The control system as described in connection with FIGS. 1 and 2, operates as follows.

When signals below the aforedefined critical frequency range are received by the switching means, filter 11 will have a blocking effect while filter 12 will pass such signals. As a result, the servo system will operate in the manner of a conventional servo system and the analog unit 6 will be inoperative.

When signals are received within the frequency range causing instability, filter 12 will have a blocking effect while filter 11 will pass such signals. As a result switching means 7 will transmit a signal received through the analog unit 6. Such signal is not influenced by any dynamic phenomenon due to the aforedescribed inherent characteristics of the analog unit.

As is now evident, the inclusion of the analog unit and the switching means in the control system afford the advantage that the control system will remain stable throughout its entire operational frequency range, even though it includes one or several components tending to cause instability within a limited range.

The modification of the switching means 7', as shown in FIG. 3, comprises two high-pass filters 11 and 14, which both pass signals within the frequency range $f_a-\infty$. The input of the filter 11 is again connected to the analog unit and the input of filter 14 to output 8. The outputs of the two filters are connected to the input of a differential unit 15, the output of which is connected to the input of an adding unit 16, which, in turn, is connected to the differential unit 1. Adding unit 16 is further connected, through a conductor 17, to the input 18 of filter 14.

The control system, including the switching means 7', according to FIG. 3, operates as follows:

When signals below the critical frequency range are received in the switching means, filters 11 and 14 will not pass such signals. As a result a signal from the output 8 will be transmitted through the input 18 and conductor 17 directly to the adding unit 16. Consequently the control system operates in the manner of a conventional control system.

However, if a signal is received within the frequency range $f_a-\infty$, the two filters will pass the transmitted signal. As a result the signal from the analog unit 6 is transmitted to the differential unit 1, through filter 11, the differential unit 15 and adding unit 16. The signal from the output 8 of the control system is transmitted to adding unit 16, through connection 17, and is also transmitted to the adding unit through filter 14 and differential unit 15. When passing differential unit 15, the sign of the signal is reversed, that is, the signal of the adding unit 16 together with the signal received by the adding unit from conductor 17, will produce a sum signal with a zero volume.

FIG. 4 shows the transfer function which occurs between amplifier 2 and load 4. The resonance phenomena mentioned hereinbefore will cause strong fluctuations of the curves near the natural frequency of the system which frequency is designated "$f_r$" in FIG. 4. As it is apparent from FIG. 4, the servo control system would be unstable if the analog unit 6 and the switching means 7 were eliminated and the conductor 9 were connected directly between the load output 8 and the differential unit 1.

FIG. 5 shows the transfer function which occurs between amplifier 2 and the output at analog unit 6. As it may be noted, the transfer function between the input at amplifier 2 and the output at switching means 7 is substantially the same as shown in FIG. 4 up to the frequency $f_a$ and as shown in FIG. 5 for the frequency above $f_a$. Consequently, the curves will thus have the same appearance as shown in FIG. 5 which represents the Bode diagram for a stable system.

Referring now to FIG. 6 which shows in detail the control system diagrammatically shown in FIG. 1, the reference numerals used to identify the blocks in FIGS. 1, 2 and 3 are repeated as much as possible in FIG. 6 to facilitate an understanding of the relation between FIG. 1 and FIG. 6.

The load 4 of FIG. 1 is indicated in FIG. 6 as a gun 4a. The gun is trained by a laying device 40 of conventional design. To simplify the illustration, only the mechanism for traversing the gun is diagrammatically shown at 4b and 4c. However, it should be understood that the control for the elevating mechanism of the gun is similarly arranged.

The output signals of laying device 40 are fed to the differential and adding unit 1+16 which, in turn, is connected to the amplifier 2. Suitable circuit components for use as unit 1+16 and amplifier 2 are described in detail on pages 90 to 110 of a book entitled, "Introduction to Electronic Analogue Computers," by Wass and published by McGraw-Hill. The output of the amplifier is connected in series with a phase-lead network 19, a D-C amplifier 20 and a control unit 21. A suitable phase-lead network is described on page 331 of vol. 1 of a book entitled, "Servomechanisms and Regulating System Design" and also on pages 119 and 149 of vol. 2 of the same book. The authors of the book are Chestnut and Mayer. The book was published by John Wiley & Sons. Control unit 21 is shown as comprising an electromagnetically controlled valve 22 which, in turn, controls a hydraulic control device 23, including a piston 24 mounted on a piston rod 25. The position of the piston controls, via a transmission unit 5, the position of a control lever 26 of a hydraulic servo motor 27. The input shaft 28 of the motor is driven at a constant rate of speed by a suitable electric motor (not shown). The output shaft 29 of motor 27 mounts a gear 30 in mesh with a gear 31 seated on an output shaft 32. Shaft 32 controls the traversing of gun 4a by means of the previously mentioned traversing mechanism 4b and 4c. A suitable servo motor 27 is described in detail on pages 184 to 186 of vol. 1 of the aforementioned book, "Servomechanisms and Regulating System Design."

Gear 30 is also engaged with a gear 33 mounted on an output shaft 34 which is connected to a position control unit 38 comprising a conventional DC-fed potentiometer. Similarly, the laying device 40 comprises a DC-fed potentiometer.

Amplifier 20, control unit 21 and servo system 3 are so correlated that the rate of movement of piston 24 and with it of rod 25 is proportional to the output of DC amplifier 20. Due to the action of transmission unit 5, control lever 26 will be placed in a position which is directly proportional to the position of piston 24. In other words, each position of lever 26 results in a corresponding rate of angular speed at the output shaft 29 of hydraulic motor 27. If there is no load at the final output shaft 32, the control unit 38 will indicate the momentary angular position of shaft 32.

As has been pointed out before, the entire control system must be as accurate as possible for the purpose for which it is here intended. To effect such accuracy, the gain amplification in the several amplifiers of the system must be kept as high as possible. The difficulty with such high gain in the system is that when shaft 32 is connected to the load, instabilities in the system unavoidably develop. Such instabilities may be caused by interaction between slip in hydraulic motor 27, due to leakage in the pipe connections, resiliency in the gear transmissions and the moment of inertia of the load, especially if such load is a heavy load, for instance a gun. The slip, the resiliency and the moment of inertia are diagrammatically indicated in FIG. 7. The designation $\varphi_{29}$ indicates the angular position of shaft 29 when there is no load on shaft 23. If there is a load, the angle will obtain the value of $\varphi_{29L}$. The symbol $K_3$ indicates the slip coefficient of hydraulic motor 27 and is measured in Newtonmeter/radian/sec.

The symbol D indicates the spring constant of the gears and shaft of servo motor unit 3 and is measured in Newtonmeter/radian. Finally, the letter L indicates the moment of inertia and is measured in kgm.²

The angular position of shaft 29, if there is no load at the shaft, can be expressed as a function of the angular position of lever 26. This function can be expressed in Laplace form as follows:

$$\frac{\varphi 29(P)}{\varphi 26(P)} = \frac{K_2}{P} \quad (1)$$

The corresponding function if there is a load at the shaft can be expressed in Laplace form, as follows:

$$\frac{\varphi 29L(p)}{\varphi 26(p)} = \frac{1+2\zeta_1\frac{p}{\omega}+\frac{p^2}{\omega_2}}{1+2\zeta_2\frac{p}{\omega}+\frac{p^2}{\omega_2}} \cdot \frac{K_2}{p} \quad (2)$$

In said equation, $$\omega^2 = \frac{D}{I} \zeta_1 \approx 0.05$$

caused by bearing friction and $$\zeta_2 = \frac{\omega}{2} \cdot \frac{I}{K_3}$$

The loaded servo system has the amplification versus frequency curve and the phase angle versus frequency curve as shown in the previously discussed FIG. 4. These curves may be considered as showing the relation between the output voltage from the potentiometer 38 and the output voltage from potentiometer 40 if there is no other input signal to the differential unit 1+16 than that from potentiometer 40.

As it is evident to experts in the art, the servo control system will be unstable if the signal from potentiometer 38 is fed back to the differential unit 1+16 and as it is well known in the art, the amplification of the system must be considerably reduced to avoid such instability.

Equations like the aforegiven Equation 2 are described on pages 184–186 of vol. 1 of the aforementioned book by Chestnut and Mayer and graphs like that of FIG. 4 are described on pages 291–318 of vol. 1 of the same book.

In order to overcome the aforedescribed phenomenon of instability which occurs at high gain and at no other feed back signal than that from potentiometer 38, the units 6 and 7 or 7', shown in FIGS. 1, 2 and 3 and described in connection therewith, are added to the system shown in FIG. 6. More specifically, the arrangement shown in FIG. 3 is used in the system of FIG. 6.

As shown in the figure, a shaft 36 is coupled to the transmission unit 5 and controls a conventional D-C fed potentiometer 37. The output voltage from this potentiometer indicates the actual position of control lever 26 of the hydraulic motor 27 and thus the actual angular velocity of output shaft 29 when there is no load on the shaft. Potentiometer 37 is connected via conductor 39 at point 41 to a unit designated (6+11+14+15) which corresponds to the units 6, 11, 14 and 15 of FIGS. 1, 2 and 3. The output voltage of potentiometer 38 is connected at point 18 to the unit (6+11+14+15). The output voltage obtained at point 41 is designated $V_{41}$ and the output voltage at 18 is designated $V_{18}$. The amplifier F in conjunction with resistor $R_1$ and capacitor $C_2$ in the unit (6+11+14+15) integrates the voltage $V_{41c}$ and to this integrated voltage is added the voltage $V_{18}$ via the amplifier F in conjunction with the capacitors $C_1$ and $C_2$. The output voltage $V_F$ of amplifier F may be mathematically expressed in Laplace form by the following equation $$V_F(P) = -\frac{V_{41}(P)}{P \cdot R_1 \cdot C_2} - V_{18}(P) \cdot \frac{C_1}{C_2} \quad (3)$$

The first part in Equation 3 is analogous to Equation 1 and shows the functioning of the analog unit 6 in FIG. 1. The second part corresponds to the signal fed to the high-pass filter 14 in FIG. 3. Functional and mathematical description in detail of such circuits may be found in the aforementioned book of "Introduction to Electronic Analogue Computers," pages 90–110.

The output voltage $V_F$, of amplifier F is filtered in the unit (6+11+14+15) by the filter network formed by the capacitors $C_3$, $C_4$, $C_5$ and the resistors $R_2$, $R_3$. The filter functions as a high-pass filter and corresponds to unit 14 in FIG. 3. The transfer function of the filter in Laplace form will be approximately $$G(p) = \left(\frac{pT}{1+pT}\right)^3 \quad (4)$$

The time constant T should be equal to $\frac{1}{2}\pi fa$, where $fa$ is the aforementioned lower limit frequency. Transfer functions for high-pass filters are given on pages 119–149 of vol. 2 of the aforementioned book by Chestnut and Mayer.

From FIG. 6 and from the above equations it appears that in the frequency domain below $fa$ the dominant feed back signal is the signal fed via conductor 17, while the input signals to unit (6+11+14+14), which, depending on gradient variations, may cause inaccuracies, are suppressed by the high-pass filter. Moreover, it is obvious that in the frequency domain above $fa$ the signal from point 18 through unit (6+11+14+15) will in the unit (1+16) cancel out the signal via conductor 17, if capacitor $C_1$ has the same value as capacitor $C_2$, and that the only resulting feed back signal of the system is that supplied by potentiometer 37 and passing through the unit (6+11+14+15) to unit (1+16).

The output gradient and polarity of potentiometer 37 and the components in unit (6+11+14+15) are chosen so that said resulting feed back signal is identical with the signal fed via conductor 17, except that it does not include the function tending to cause instability and given in Equation 2 and illustrated in FIG. 4.

In a servo system according to FIG. 7 for a natural frequency of 7 cycles per second and for a lower limit frequency of 1 cycle per second, an error of only 0.1° was found when a sinusoidal oscillation having an amplitude of 10° and a cycle time of 3 seconds were used. In contradistinction thereto, in a conventional control system, that is, without the components 6 and 7 or 7', in which the amplification was reduced to an extent such that instability did not occur, the corresponding error factor was 0.4°.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A stabilizing device for a control system operating with electrical signals comprising:

at least one signal-transmitting component having an input side and an output side and capable of exhibiting within a limited frequency range mechanical instability phenomena tending adversely to affect the stability of the system;

signal-transmitting analog means having the same signal-transmitting characteristics but being free of said phenomena throughout the entire operating range of the system;

signal-transmitting switching means comprising a filter network passing signals only within said limited frequency range including at least two high-pass filters each having an input side and an output side, a differential unit having an input and an output, and an adding unit having two inputs and one output, the outputs of said filters being connected to the input of said differential unit, the output of said differential unit being connected to one input of said adding unit, the other input of said adding unit being connected to the input side of one of said filters, the portion of the switching means between the input side of said one filter and the output of said adding unit constituting part of a resetting device for the control of the system;

means for connecting the input side on said one filter to the output side of said component;

means for connecting the input side of said other filter to the output side of said analog means; and means for connecting the output of said adding unit to the input side of said component.

2. The stabilizing device of claim 1 wherein said signal-transmitting component comprises a load and means for driving said load.

3. A stabilizing device for a control system according to claim 1, wherein said analog means is an integrating element responsive to input signals coupled to said signal-transmitting component.

References Cited

UNITED STATES PATENTS

| | | | |
|---|---|---|---|
| 3,184,662 | 5/1965 | Wallace | 318—18 |
| 3,273,035 | 9/1966 | Inderhees | 318—18 |

FOREIGN PATENTS

| | | |
|---|---|---|
| 174,777 | 3/1961 | Sweden. |

BENJAMIN DOBECK, *Primary Examiner.*